No. 863,752. PATENTED AUG. 20, 1907.
J. H. PIERCE.
VALVE FOR MOTORS.
APPLICATION FILED APR. 23, 1907.
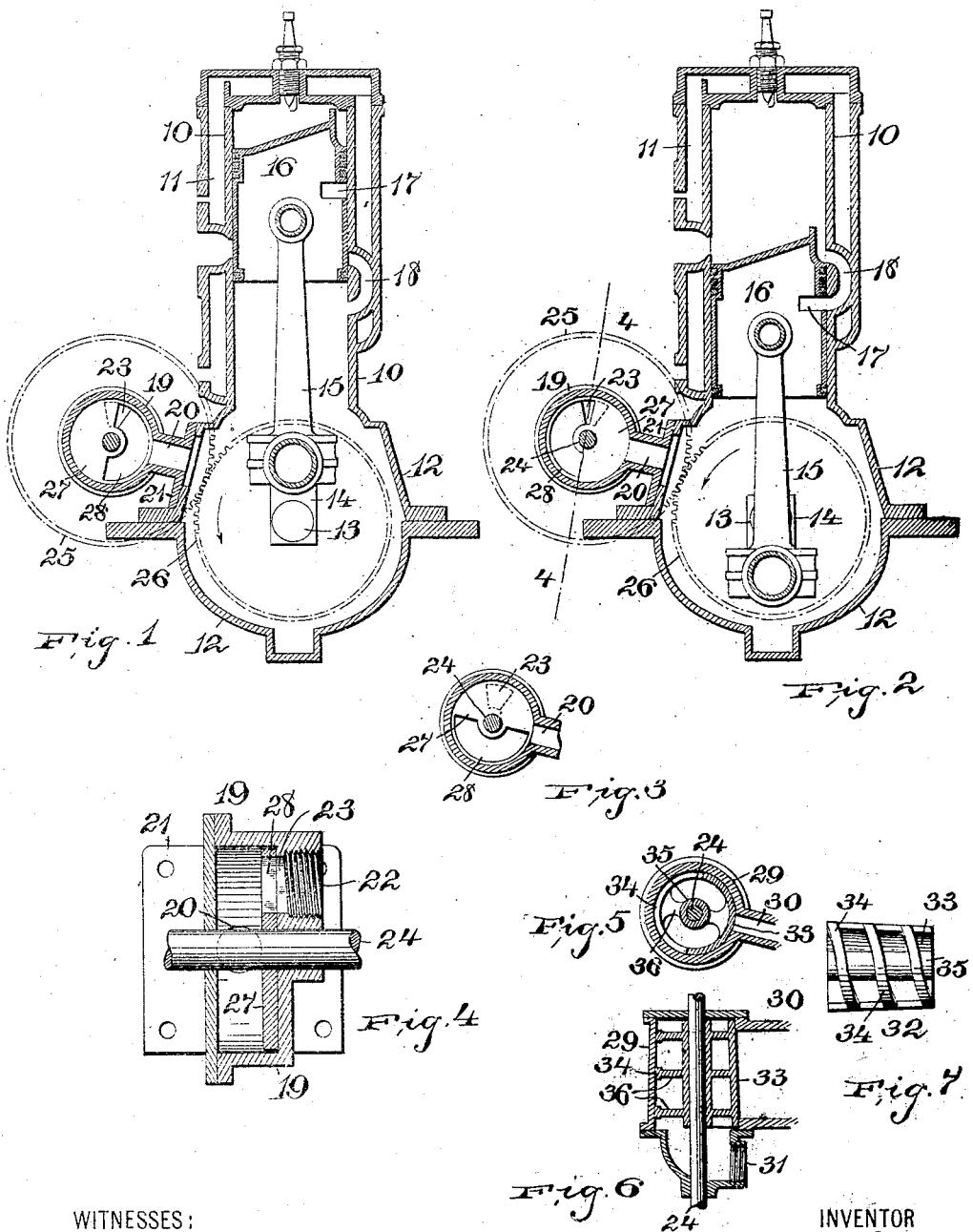
WITNESSES:
S. A. Rogers
E. A. Vell
INVENTOR
James H. Pierce
BY
Wm H. Caufield
ATTORNEY.

and my improved valve with the piston about to descend. Fig. 2 is a similar view with the piston at the other extreme of its travel. Fig. 3 is a detail section of the valve when it is closed. Fig. 4 is an enlarged section on line 4, 4, in Fig. 2. Figs. 5 and 6 are a vertical and horizontal section, respectively, of a modified form of valve, and Fig. 7 is an elevation of the valve cylinder used in the modification.
UNITED STATES PATENT OFFICE.

JAMES H. PIERCE, OF BAY CITY, MICHIGAN, ASSIGNOR TO SMALLEY MOTOR CO., LTD. BAY CITY, MICHIGAN, A CORPORATION OF MICHIGAN.

LVE FOR MOTORS.

No. 863,752.      Specification of Letters Patent.      Patented Aug. 20, 1907.

Application filed April 23, 1907. Serial No. 369,806.

*To all whom it may concern:*

Be it known that I, JAMES H. PIERCE, a citizen of the United States, residing at Bay City, in the county of Bay and State of Michigan, have invented certain new and useful Improvements in Valves for Motors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a valve for admitting air or gas to the crank-case of a two-cycle engine, and is designed to admit the air or gas during the complete upward stroke of the piston of the engine, whereby a full supply of air or gas is contained in the crank-case, to be thoroughly compressed when the piston of the engine descends.

The valve regulating the intake, as above described, is arranged on the outside of the crank-case, and is connected therewith by the required size of passage. The valve so installed, is operated by the rotation of the shaft of the engine and is not opened by suction, but when compression takes place in the crank-case, the valve is tightly pressed to its seat by reason of the compression. This valve, in other words, acts as a positively operated rotary check valve for admitting air or gas to the crank-case during the upward stroke of the piston, and holding the pressure in the case, when the piston descends, until the gas or air passes to the cylinder on top of the piston.

The invention is illustrated in the accompanying drawings, in which

Figure 1 is a section of a two-cycle engine, and my improved valve with the piston about to descend. Fig. 2 is a similar view with the piston at the other extreme of its travel. Fig. 3 is a detail section of the valve when it is closed. Fig. 4 is an enlarged section on line 4, 4, in Fig. 2. Figs. 5 and 6 are a vertical and horizontal section, respectively, of a modified form of valve, and Fig. 7 is an elevation of the valve cylinder used in the modification.

I employ, in my construction, any usual form of cylinder 10 with a conventional cooling chamber 11, and the cylinder merges into a crank-case 12 which is made air-tight. The usual shaft 13, crank-shaft 14, piston-rod 15 and piston 16 are used, and there are passages 17 and 18 in the piston and cylinder, respectively, which are in register when the piston is at its lowest point of travel.

On the exterior of the crank-case is mounted a valve-casing 19 which has a tube or port 20 which is secured, by means of the plate 21, to the outside of the crank-case. One end of the valve casing is provided with a threaded perforation for a pipe connection 22, and merging with an inlet port 23. A shaft 24 passes through the valve casing and is caused to revolve by the gears 25 and 26, although any mechanical equivalent can be employed to rotate the valve, and the rotation can be secured from an element other than the shaft of the engine. On the shaft 24, and adjacent to the wall with the inlet port, is a valve disk 27 which is cut away at 28 so that the cut away portion will uncover the inlet port 23 during one-half the rotation of the valve.

In describing the operation of the device, I will assume the engine in the position shown in Fig. 2, where the piston is about to ascend. The valve is operated to open the port 23, as the piston starts, and the air or gas is admitted in full volume during half the revolution of the valve, in other words, until the piston reaches its high point, shown in Fig. 1, by passing through the valve casing 19 and port 20. The crank-case is now full of gas or air, and the piston descends on the gas or air to compress it, and at the same time the valve disk closes the inlet to the valve casing, as shown in Fig. 3, this figure illustrating the valve in the position it occupies when the piston is half way down the cylinder in its descent. The compression of gas or air tends to press the valve disk 27 against the wall of the valve-casing, and thus insure the tight seating of the valve. The compression continues until the passage 17 and 18 are in communication, and then the compressed air or gas passes to the top of the cylinder and the piston starts to ascend, opening the valve 27 again to admit more air or gas to the crank-case.

In Figs. 5, 6, and 7 I illustrate a modified form of valve which has the valve casing 29, with the duct 30, leading to the crank-case and having the inlet 31 on one end. The valve cylinder 32 is installed in the casing and has the semi-cylindrical shell portion 33, and the other half of the cylinder having the diagonal strips 34. A hub 35 and the spokes 36 allow the gas to pass inside the cylinder, and the strips 34, by bearing on the opposed side of the inside of the valve casing, prevent the valve cylinder from being pushed away from the opening of the duct 30 by the compression of gas in the crank-case.

It will be obvious that the particular form of valve is not particularly essential, the particular feature of this device being the arrangement of a valve casing with its valve, on the outside of the crank-case, and a positive driving of the valve to cause its opening and closing, each for a full stroke of the piston in one direction.

Having thus described my invention, what I claim is:—

1. In combination with a two-cycle engine having a cylinder and crank-case, of a valve casing on the exterior of the crank-case having a passage connecting with the crank-case, a valve in the valve casing, and means for mechanically operating the valve.

2. In combination with a two-cycle engine having a cylinder and a crank-case, of a valve casing on the exterior of the crank-case and having a passage communicating therewith, a valve arranged to rotate in the casing and adapted to open during half the rotation, and means for driving the valve from the engine.

3. In combination with a two-cycle engine having a cylinder and a crank-case, of a valve casing on the exterior of the crank-case and having a passage communicating therewith, the valve casing being cylindrical, a circular valve in the casing and adapted to rotate to open during half its rotation, and means for driving the valve from the engine.

4. In combination with a two-cycle engine having a cylinder and a crank-case, of a valve casing on the exterior of the crank-case and having a passage communicating therewith, the valve casing being cylindrical, a circular valve in the casing and adapted to rotate to open during half its rotation, a shaft for rotating the valve, a gear on the shaft, and a gear in mesh therewith and driven by the shaft of the engine.

5. In combination with a two-cycle engine having a cylinder and a crank-case, of a cylindrical valve casing on the exterior of the crank-case and having a passage connecting with the crank-case, the valve casing having an inlet on one end, a valve arranged to rotate in the casing and adapted to close the inlet for one-half its rotation, and means for driving the valve from the engine.

6. In combination with a two-cycle engine having a cylinder and a crank-case, of a cylindrical valve casing on the crank-case having a passage communicating with the crank-case and having an inlet on one end, a circular valve rotating in the valve casing and having a cut away portion to come in register with the inlet on the end of the valve casing to open the inlet during part of the rotation of the valve.

7. In combination with a two-cycle engine having a cylinder and a crank-case, of a valve casing on the exterior of the crank-case having a passage connecting with the crank-case and having an inlet port on one end, of a valve disk riding against the inlet end of the valve casing and being cut away to allow the cut away portion to be in register with the inlet of the valve casing during a portion of the rotation of the valve disk, and means for rotating the valve.

8. In combination with a two-cycle engine having a cylinder and a crank-case, a piston in the cylinder, a shaft on the engine, and a connection between the shaft and the piston, of a valve on the exterior of the crank-case having a passage connecting therewith, and having an inlet port on one end, a valve arranged to rotate in the casing and arranged to open the inlet during half of its rotation, and means for rotating the valve from the shaft of the engine to open the valve during the entire ascent of the piston.

9. In combination with a two-cycle engine having a cylinder and a crank case, of a cylindrical valve casing on the outside of the crank-case having a passage communicating with the crank-case and having an inlet on one end, of a valve rotating in the valve casing and mounted on a shaft therein, the valve being adapted to shut during one-half its rotation, and means on the exterior of the valve casing and the crank-case to operate the valve from the shaft of the engine.

In testimony, that I claim the foregoing, I have hereunto set my hand this second day of April, 1907.

JAMES H. PIERCE.

Witnesses:
LOUIS GOESCHEL,
J. R. HANLEY.